Feb. 20, 1940.    J. T. MENKEN ET AL    2,191,081
WHEEL MOUNTING DEVICE
Filed Jan. 22, 1938
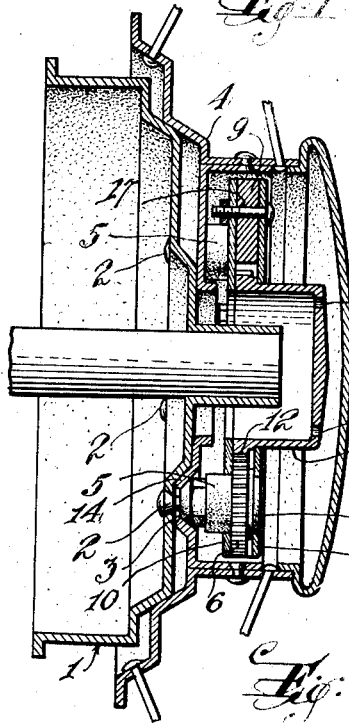
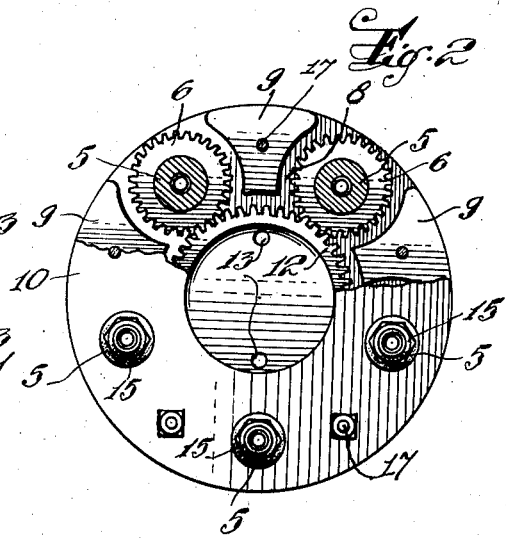
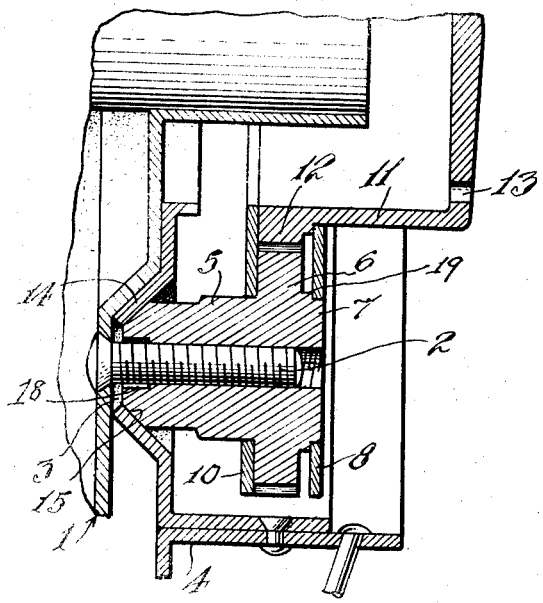
INVENTORS
John T. Menken
BY Frank B. Herbert
Fred C. Fischer
ATTORNEY Patented Feb. 20, 1940

2,191,081

UNITED STATES PATENT OFFICE 2,191,081

WHEEL MOUNTING DEVICE

John T. Menken, Hillsdale, and Frank B. Herbert, Westwood, N. J.

Application January 22, 1938, Serial No. 186,264

2 Claims. (Cl. 301—9)

This invention relates to means to facilitate the locking of demountable wheels of motor vehicles.

The usual demountable wheel as now provided on motor vehicles is mounted on a plurality of threaded studs projecting from a drum. The studs pass through openings in the wheel, and the wheel is positively locked to the drum by nuts engaging the studs. There are usually 5 or 6 nuts and they tightly engage the studs, which, when it is necessary to remove a wheel to change a tire or for other purposes, requires 5 or 6 operations to loosen the nuts on the studs. Similarly, when the wheel is mounted on the drum the same number of operations are required to tighten the nuts on the studs.

It is an object of this invention to provide a device whereby a wheel can be unlocked or locked to a drum by a single operation.

A further object of the invention is the provision of a locking and unlocking device for demountable wheels which is applicable to standard types of vehicle wheels without material alteration.

A further object of this invention is the provision of a tool which can be used for conveniently and rapidly tightening or loosening a plurality of nuts from a plurality of studs by a single operation.

These and other advantageous objects, which will later appear, are accomplished by the simple and practical construction and arrangement of parts hereinafter described and exhibited in the accompanying drawing, forming part hereof, and in which:

Fig. 1 is a vertical section taken through the center of the hub portion of a demountable wheel provided with our improved locking and unlocking device, Fig. 2 is an elevational view of our improved device with parts broken away, and Fig. 3 is an enlarged section of a part of a demountable wheel and a part of our improved device.

Referring to the drawing, there is shown in Figs. 1 and 3 a standard type of drum 1, having projecting therefrom a plurality of threaded studs 2 which pass through openings in the hub 3 of a vehicle wheel 4.

The device for locking the wheel to the drum, (see Fig. 3) is provided with a plurality of rotatable nuts 5 which engage the studs 2. Each of the nuts 5 has fixed thereto a small gear 6 which has a shoulder 19 engaging with a plate 8, and a projection 7 rotatably passing through apertures in the plate 8, which is provided with a plurality of spacing blocks 9 which separate plate 8 from a cover plate 10, the blocks 9 having a width greater than the width of the gears 6 so that the gears can freely rotate between the plates. Plates 8 and 10 are secured together by means of bolts 17 passing through the plates and the spacing blocks 9. The plate 8 is provided with an aperture at the center thereof through which passes a cap 11 having a gear 12 attached to one end thereof, the other end of the cap being provided with spaced holes 13 adapted to receive a Spanner wrench to rotate the cap 11 and the gear 12. The gear 12 is in mesh with the plurality of small gears 6 so that when gear 12 is rotated the small gears 6 will be rotated to simultaneously rotate the nuts 5.

In locking or unlocking a vehicle wheel, the nuts 5 are placed over the studs 2 and the gear 12 is rotated by means of a Spanner wrench or other tool engaging the cap 11. This operation rotates the nuts 5 in the desired direction to tighten the nuts on the studs or to loosen them.

While the above device has been described as being provided with holes 13 for receiving the Spanner wrench it is obvious that the cap 11 might be polygonal so that it can receive a different type of tool without departing from the spirit of the invention.

The openings in the hub plate of the wheel are surrounded by short flanges 14 (see Fig. 3) which taper outwardly. The nuts 5 have their ends thereof inwardly tapered as shown at 15 to fit in the tapered flange 14 when the nuts are being attached to the studs 2. By providing the tapered flanges surrounding the apertures and tapering the ends of the nuts, centering and properly positioning of the nuts on the studs is facilitated and assured. The end of the nut is also provided with a counter-sunk portion 18 which is not threaded, and which facilitates the entrance of the stud 2 into the nut.

From the above description it will be seen that there has been provided a simple and rugged device for readily and conveniently locking a demountable wheel to a vehicle by a simple operation.

The foregoing disclosure is to be regarded as descriptive and illustrative only, and not as restrictive or limitative of the invention, of which, obviously, embodiments may be constructed including many modifications, without departing from the spirit and scope of the invention herein set forth and denoted in the appended claims.

Having thus described our invention, what we claim as new and desire to secure by Letters Patent, is:

1. In a device for locking a demountable wheel upon a plurality of threaded studs, a plurality of threaded nuts adapted to engage said studs, small gears attached to said nuts, a pair of spaced plates rotatably supporting said gears and nuts, one of said plates having an opening at the center thereof, a cap passing through the opening at the center of one of said plates and having a large gear engaging all of said small gears, and means to enable the cap to be rotated by a tool.

2. In a device for locking a demountable wheel upon a plurality of threaded studs, a plurality of threaded nuts adapted to engage said studs, small gears integral with said nuts, a pair of spaced plates rotatably supporting said gears and nuts, means for maintaining said plates spaced apart, one of said plates having an opening at the center thereof, a cap passing through said opening and having a large gear integral therewith, said large gear being in mesh with all of the small gears, and means to enable the cap to be rotated by a tool.

JOHN T. MENKEN.
FRANK B. HERBERT.